Patented Apr. 8, 1941

2,237,353

UNITED STATES PATENT OFFICE 2,237,353

CATALYTIC PROCESS FOR ACETYLENE POLYMERIZATION

Max Lange, Frankfort-on-the-Main-Unterliederbach, Germany, assignor to I. G. Farbenindustrie Aktiengesellschaft, Frankfort-on-the-Main, Germany No Drawing. Application August 26, 1939, Serial No. 292,072. In Germany September 1, 1938

4 Claims. (Cl. 260—678)

This invention relates to polymerization of acetylene. More particularly, it relates to the polymerization of acetylene to produce non-benzenoid polymers thereof. More specifically, the invention relates to a new catalytic process for the non-benzenoid polymerization of acetylene and to a catalyst therefor comprising sulfuric acid and copper.

It is known that acetylene may be polymerized to produce non-benzenoid polymers thereof and process and catalyst therefor have been described in U. S. Patent Nos. 1,811,959, 1,926,039, 1,926,055, 1,926,056, 1,876,857, 2,048,838, 2,110,971, 2,162,373, and elsewhere. All of this prior art is based upon the catalytic action of cuprous copper either alone or assisted by another material as a catalyst. The action of acetylene on sulfuric acid has also been widely discussed in the literature. From this a few examples may be cited. According to Lagermarck and Eltekoff (Ber. vol. 10 (1877) p. 627) acetylene, if introduced into sulfuric acid of 1.35 sp. gr., in spite of prolonged action is absorbed only to a slight degree, and converted to aldehyde. Muthmann (Ber. 31 (1898) p. 1880) states that acetylene is attacked by concentrated sulfuric acid only very slowly and that methane-disulfonic acid is formed.

According to German Patent 338,281 of May 25, 1918, vinylsulfuric acid of the composition $CH_2=CH.O.SO_3H$ is formed if acetylene is introduced into concentrated sulfuric acid at a pressure of 2 to 5 atmospheres, particularly if mercury compounds are added to accelerate the reaction. This vinylsulfuric acid could not be isolated and to date is unknown. Under different conditions, acetaldehyde is obtained from acetylene, sulfuric acid, and mercury salts, possibly with the addition of other substances such as iron salts. The industrial production of acetaldehyde or acetic acid is based on this reaction.

It is an object of this invention to discover a new process and new catalyst for the non-benzenoid polymerization of acetylene. It is a further object of the invention to discover an improved process and catalyst for the production of monovinylacetylene. Other objects will become apparent hereinafter.

These objects have been accomplished by the discovery that acetylene forms a complex with sulfuric acid and copper which is very active, and that the polymerization of acetylene to nonbenzenoid polymers thereof may be accomplished by bringing acetylene into contact with a catalyst comprising sulfuric acid and copper. This catalyst may contain additionally copper salts, preferably copper sulfate, and its life may be improved by the addition of ammonium salts and salts of nitrogenous bases such as amine salts.

In order that the invention may be more fully understood, it is illustrated in the following examples which are to be considered as illustrative of the invention and not as limitations thereon.

Example I

Into a suitable agitated vessel, 250 cc. of 95 per cent sulfuric acid and 16 g. of copper powder are charged and acetylene is introduced with slight cooling so that the temperature is about 20°. After 12 to 14 liters of acetylene have been absorbed, the copper disappears almost entirely and an almost complete solution of slightly brownish-gray color is obtained. If this reaction mass is decomposed by careful addition of water, a gas is evolved which consists essentially of acetylene and vinyl-acetylene. In the reaction vessel remains a brown aqueous solution which smells of $SO_2$ and aldehyde, and in which a brown precipitate is suspended which probably consists principally of copper acetylide and copper sulfide.

Example II

Acetylene is introduced at 40° C. into a mixture of 250 cc. of concentrated sulfuric acid, 40 g. of anhydrous copper sulfate and 16 g. of copper bronze. The reaction gas which is evolved consists of unreacted acetylene and vinylacetylene. The presence of $SO_2$ and copper sulfide could not be observed in this case and only traces of aldehyde could be detected.

Example III

A current of acetylene is introduced at about 30° C. into a mixture of 400 parts by volume of 60 per cent sulfuric acid, 265 parts by weight of ammonium sulfate, 80 parts by weight of anhydrous copper sulfate and 32 parts by weight of copper powder. The catalyst mass becomes gradually Bordeaux-colored. The escaping gas, after suitable drying, is conducted through a receiver and cooled to —80° C. In this receiver, a water-clear liquid separates out which consists of vinylacetylene, acetylene, and a small quantity of divinylacetylene. The unreacted as well as uncondensed acetylene can be recycled after addition of fresh acetylene.

A concentration of sulfuric acid which may be used varies widely and may be as low as 40 per cent. Preferably, the concentration of sulfuric acid should be within the range of 60 to 95 per cent. The quantity of copper is not critical, but may be varied within wide limits.

While the reaction may be carried out solely in the presence of sulfuric acid and copper, this procedure is not preferred because there is a tendency for the sulfuric acid to be reduced and converted to $SO_2$ or $H_2S$ because of a side reaction, and, as a result thereof, a part of the copper is converted to copper sulfide. This can be avoided by the addition of copper salts to the catalyst, the preferred salt being copper sulfate which may be added as anhydrous copper sulfate or as the hydrated salt. When the hydrated salt is used, the concentration of sulfuric acid is maintained by the addition of a sufficient amount of more concentrated acid to offset the presence of the water of hydration. The life of the catalyst can be considerably increased by the addition of ammonium salts or the salts of nitrogenous bases such as diethylamine, pyridine, etc. The preferred member of this group is ammonium sulfate. The amount of salts which is added to the sulfuric acid-copper catalyst may be varied within wide limits.

The temperature to which the reaction may be carried out varies over a wide range. However, at high temperatures, the formation of divinyl acetylene is favored at the expense of monovinylacetylene, and, accordingly, where it is desired to form monovinylacetylene as to principal product of the reaction, a temperature range of from 20° C. to 40° C. is preferred.

The reaction may be carried out under atmospheric, below atmospheric, or above atmospheric pressure. While the reaction proceeds satisfactorily at atmospheric pressure, a more rapid conversion is accomplished with increase in pressure.

The process may be carried out as a batch reaction, as, for example, according to the process of Example I, or the process may be carried out in a continuous manner, as by the process of Example III. Moreover, any of the prior art processes and apparatuses may be used for carrying out the present process.

The processes of the prior art for the non-benzenoid polymerization of acetylene have, in general, been based upon the catalytic effect of the cuprous ion in a polar solvent such as water. While acids have been present, the purpose has been to maintain a proper pH for the reaction. Metallic copper has been present, but its purpose has been merely to assure the maintaining of the copper ions in the cuprous state. The present invention is founded upon the surprising discovery that acetylene enters a complex when reacted with copper and sulfuric acid, which complex is very reactive and gives rise to the production of non-benzenoid polymers of acetylene. The catalyst is improved by the addition of copper salts. In the catalyst, the ammonium salts primarily tend to stabilize and increase the life of the catalyst, and their role is, accordingly, a secondary one, which may be omitted if desired.

It is apparent that any widely different embodiments of this invention may be made without distinguishing from the spirit and scope thereof, and, therefore, it is not intended to be limited except as indicated in the appended claims.

I claim:

1. Process which comprises polymerizing acetylene to non-benzenoid polymers thereof by passing acetylene into contact with a mixture comprising sulfuric acid of at least 40 per cent concentration and copper.

2. Process of polymerizing acetylene to non-benzenoid polymers thereof which comprises passing acetylene into contact with a mixture comprising sulfuric acid of at least 40 per cent concentration, copper, copper sulfate and ammonium sulfate.

3. Process of polymerizing acetylene to non-benzenoid polymers thereof which comprises passing acetylene into a mixture comprising sulfuric acid of at least 40 per cent concentration and copper until a solution of the thereby formed complex is obtained and decomposing the reaction mass by the addition of water.

4. Process of polymerizing acetylene to non-benzenoid polymers thereof which comprises continuously passing acetylene into contact with a mixture comprising sulfuric acid of from 60 to 95 per cent concentration, copper, copper sulfate, and ammonium sulfate, removing acetylene polymers from the effluent gases and recycling the unreacted acetylene.

MAX LANGE.